(12) United States Patent
Protopopov

(10) Patent No.: US 6,870,896 B2
(45) Date of Patent: *Mar. 22, 2005

(54) DARK-FIELD PHASE CONTRAST IMAGING

(75) Inventor: Vladimir V. Protopopov, Petrovsko-Razumovskaya Alley (RU)

(73) Assignee: Osmic, Inc., Auburn Hills, MI (US)

( * ) Notice: Subject to any disclaimer, the term of this patent is extended or adjusted under 35 U.S.C. 154(b) by 14 days.

This patent is subject to a terminal disclaimer.

(21) Appl. No.: 10/035,025

(22) Filed: Dec. 28, 2001

(65) Prior Publication Data

US 2002/0136352 A1 Sep. 26, 2002

Related U.S. Application Data

(60) Provisional application No. 60/272,354, filed on Feb. 28, 2001, and provisional application No. 60/258,851, filed on Dec. 28, 2000.

(51) Int. Cl.⁷ .................................................. G03H 5/00
(52) U.S. Cl. ............................. 378/36; 378/62; 378/87
(58) Field of Search ............................ 378/36, 62, 84, 378/85, 87, 90; 359/618

(56) References Cited

U.S. PATENT DOCUMENTS

| | | |
|---|---|---|
| 2,853,617 A | 9/1958 | Berreman |
| 3,032,656 A | 5/1962 | Hosemann et al. |
| 3,409,372 A | 11/1968 | Ricken |

(List continued on next page.)

FOREIGN PATENT DOCUMENTS

| | | |
|---|---|---|
| EP | 0 274 155 B1 | 3/1992 |
| EP | 0 623 817 A1 | 11/1994 |
| GB | 2 137 453 A | 10/1984 |
| GB | 2 203 620 A | 10/1988 |
| JP | 0 20444088 | 11/1991 |
| WO | WO 88/08530 | 11/1988 |
| WO | WO 95/05725 | 2/1995 |

OTHER PUBLICATIONS

Wayne T. Sproull, "X–Rays in Practice", published by McGraw–Hill Book Company, 1946, pp. 391–409.

"X–Ray Diffractometer for Thin Films", IBM Technical Disclosure Bulletin, published by IBM, May 1969, pp. 1728–1729.

"Use of Lithography to Subject Crystal Wafers to a Controlled Elastic or Plastic Strain", IBM Technical Disclosure Bulletin, published by IBM, Dec. 1985, p. 3166–3167.

Leonid V. Araroff, "X–Ray Spectroscopy", Published by McGraw–Hill Book Company, 1974, pp.54–67 and 101–106.

"Mearsuring Tensions in Thin Films", IBM Technical Disclosure Bulletin, published by IBM, Oct. 1974, pp. 1394–1395.

"Device for Automatic Recording of X–Ray Spectra", IBM Technical Disclosure Bulletin, published by IBM, Jul. 1980, pp. 833–834.

K.M. Podurets et al., "Neutron Radiography with Refraction Constant" Physics B vols. 156 & 157, 1989, p. 691.

(List continued on next page.)

*Primary Examiner*—Edward J. Glick
*Assistant Examiner*—Elizabeth Keaney
(74) *Attorney, Agent, or Firm*—Brinks Hofer Gilson & Lione

(57) ABSTRACT

A method of imaging an object that includes subjecting an object to a beam of radiation that is directed along a first direction and analyzing a first portion of the beam of radiation that is transmitted through the object along the first direction so that the intensity of the first portion is suppressed. Analyzing a second portion of the beam of radiation that is refracted from the object. Generating an image of the object based on the suppressed first portion of the beam of radiation and the second portion of the beam of radiation.

25 Claims, 5 Drawing Sheets

U.S. PATENT DOCUMENTS

| | | |
|---|---|---|
| 3,614,425 A | 10/1971 | Yoshimatsu |
| 3,899,253 A | 8/1975 | Overhoff |
| 3,927,319 A | 12/1975 | Wittry |
| 4,274,000 A | 6/1981 | Goebel |
| 4,364,122 A | 12/1982 | Wolfel et al. |
| 4,461,018 A | 7/1984 | Ice et al. |
| 4,525,853 A | 6/1985 | Keem et al. |
| 4,547,801 A | 10/1985 | Haisma et al. |
| 4,599,741 A | 7/1986 | Wittry |
| 4,611,341 A | 9/1986 | Brody |
| 4,643,951 A | 2/1987 | Keem et al. |
| 4,675,889 A | 6/1987 | Wood et al. |
| 4,684,565 A | 8/1987 | Abeles et al. |
| 4,693,933 A | 9/1987 | Keem et al. |
| 4,716,083 A | 12/1987 | Eichen et al. |
| 4,717,632 A | 1/1988 | Keem et al. |
| 4,724,169 A | 2/1988 | Keem et al. |
| 4,727,000 A | 2/1988 | Ovshinsky et al. |
| 4,741,620 A | 5/1988 | Wickramasinghe |
| 4,777,090 A | 10/1988 | Ovshinsky et al. |
| 4,783,374 A | 11/1988 | Custer et al. |
| 4,785,470 A | 11/1988 | Wood et al. |
| 4,867,785 A | 9/1989 | Keem et al. |
| 4,873,439 A | 10/1989 | Hagelstein et al. |
| 4,884,697 A | 12/1989 | Takacs et al. |
| 4,890,310 A | 12/1989 | Umetani et al. |
| 4,916,721 A | 4/1990 | Carr et al. |
| 4,928,294 A | 5/1990 | Beard, Jr. et al. |
| 4,953,188 A | 8/1990 | Siegel et al. |
| 4,969,175 A | 11/1990 | Nelson et al. |
| 5,016,267 A | 5/1991 | Wilkins |
| 5,082,621 A | 1/1992 | Wood |
| 5,162,872 A | 11/1992 | Vanasse |
| 5,167,912 A | 12/1992 | Wood |
| 5,173,928 A | 12/1992 | Momose et al. |
| 5,245,648 A | 9/1993 | Kinney et al. |
| 5,259,013 A | 11/1993 | Kuriyama et al. |
| 5,307,395 A * | 4/1994 | Seely et al. ................ 378/84 |
| 5,319,694 A | 6/1994 | Ingal et al. |
| 5,384,817 A | 1/1995 | Crowther et al. |
| 5,406,609 A | 4/1995 | Arai et al. |
| 5,408,512 A | 4/1995 | Kuwabara et al. |
| 5,450,201 A | 9/1995 | Katzir et al. |
| 5,458,084 A | 10/1995 | Thorne et al. |
| 5,551,587 A | 9/1996 | Keppel et al. |
| 5,579,363 A | 11/1996 | Ingal et al. |
| 5,592,338 A | 1/1997 | Citterio |
| 5,638,175 A | 6/1997 | Brunfeld et al. |
| 5,646,976 A | 7/1997 | Gutman |
| 5,684,852 A | 11/1997 | Tomie |
| 5,715,291 A | 2/1998 | Momose |
| 5,732,120 A | 3/1998 | Shoji et al. |
| 5,757,882 A | 5/1998 | Gutman |
| 5,784,162 A | 7/1998 | Cabib et al. |
| 5,799,056 A | 8/1998 | Gutman |
| 5,802,137 A | 9/1998 | Wilkins |
| 5,850,425 A | 12/1998 | Wilkins |
| 5,878,108 A | 3/1999 | Baba et al. |
| 5,881,126 A * | 3/1999 | Momose .................. 378/36 |
| 5,898,752 A | 4/1999 | Van Der Wal |
| 5,914,997 A | 6/1999 | Van Egeraat |
| 5,930,325 A | 7/1999 | Momose |
| 5,936,255 A | 8/1999 | Nakanishi et al. |
| 5,987,095 A | 11/1999 | Chapman et al. |
| 6,014,423 A | 1/2000 | Gutman et al. |
| 6,018,564 A | 1/2000 | Wilkins |
| 6,018,565 A | 1/2000 | Ergun et al. |
| 6,021,223 A | 2/2000 | Toyoda et al. |
| 6,041,099 A | 3/2000 | Gutman et al. |
| 6,069,933 A | 5/2000 | Schultz |
| 6,069,934 A | 5/2000 | Verman et al. |
| 6,144,719 A | 11/2000 | Hasegawa et al. |
| 6,195,410 B1 | 2/2001 | Cash, Jr. |
| 6,212,254 B1 | 4/2001 | Wilkins |
| 6,226,349 B1 | 5/2001 | Schuster et al. |
| 6,226,353 B1 | 5/2001 | Wilkins et al. |
| 6,295,130 B1 | 9/2001 | Sun et al. |
| 6,330,301 B1 | 12/2001 | Jiang |
| 6,389,100 B1 | 5/2002 | Verman et al. |
| 6,421,417 B1 | 7/2002 | Jiang et al. |

OTHER PUBLICATIONS

English language abstract regarding Japanese published application No. 61–256243 that was published Nov. 13, 1986, while the date of publication of the English language abstract is unknown it is believed to have occurred prior to Mar. 1, 2000.

English language abstract regarding Japanese published application No. 63–53456 that was published Mar. 7, 1988, while the date of publication of the English language abstract is unknown it is believed to have occured prior to Mar. 1, 2000.

English language abstract regarding Japanese published application No. 1–187440 that was published Jul. 26, 1989, while the date of publication of the English language abstract is unknown it is believed to have occured prior to Mar. 1, 2000.

Pending U.S. Appl. No. 09/797,498, filed Mar. 1, 2001 by Martyhov et al.

V.V. Protopopov et al., "X–Ray Multilayer Mirrors With An Extended Angular Range," Optics Communications, vol. 158, Dec. 15, 1998, pp. 127–140.

V.V. Protopopov, "On the Possibility of X–Ray Refractive Radiography Using Multilayer Mirrors With Resonant Absorption," Optics Communications, vol. 174, Jan. 15, 2000, pp. 13–18.

Richard Fitzgerald, "Phase–Sensitive X–Ray Imaging," Physics Today, Jul. 2000, pp. 23–26.

V.V. Protopopov et al., "Observation of X–Ray Refraction Contrast Using Multilayer Mirrors With Resonant Absorption," Optics Communications, Dispatch 17, Aug. 2000, pp. 1–6.

INSPEC Abstract No. A1999–18–8760J–017, B1999–09–7510P–044, available on or before Feb. 8, 2001, 2 pages, regarding "Mammography Imaging Studies Using A Laue Crystal Analyzer," by Chapman et al., Review of Scientific Instruments Conference, vol. 67, No. 9, Sep. 1996, p. 5.

INSPEC Abstract No. A9514–0785–044, B9508–7450–005, available on or before Feb. 8, 2001, 2 pages, regarding "Backscattering Analyzer Geometry As A Straightforward and Precise Method for Monochromator Characterization at Third–Generation Synchrotron–Radiation Sources," by Snigirev et al., Review of Scientific Instruments, vol. 66, No. 2, Pt. 2, Feb., 1995, p. 2228.

INSPEC Abstract No. A9502–6110D–005, available on or before Feb. 8, 2001, 2 pages, regarding "The Resolution Function of a Triple–Crystal Diffractometer for High–Energy Synchrotron Radiation in Nondispersive Laue Geometry," by Neumann et al., Journal of Applied Crystallography, vol. 27, Pt. 6, Dec. 1, 1994, pp. 1030–1038.

INSPEC Abstract No. A9210–0785–020, available on or before Feb. 8, 2001, 2 pages, regarding "Polarization Analysis in Magnetic X–Ray Scattering Using 45 Degrees Linearly Polarized X–Ray Incident Beam," by Mori et al., Review of Scientific Instruments, vol. 63, No. 1, Pt. 11B, Jan., 1992, p. 1176.

INSPEC Abstract No. A9209–0785–045, available on or before Feb. 8, 2001, 2 pages, regarding "Focusing Monochromator for High Energy Synchrotron Radiation," by Suortti, P., Review of Scientific Instruments, vol. 63, No. 1, Pt. 11B, Jan., 1992, pp. 942–945.

INSPEC Abstract No. A83081373, available on or before Feb. 8, 2001, 2 pages, regarding "Use of a Position Sensitive Detector for Data Acquisition of Synchroton X–Ray Diffraction from Absorbed Gas Monolayers on Graphite," by Bohr et al., Nuclear Instruments and Methods in Physics Research, vol. 208, Nos. 1–3, Apr. 15, 1983, pp. 555–558.

INSPEC Abstract No. A9223–0785–008, available on or before Feb. 8, 2001, 1 page, regarding "Refraction Contrast in X–Ray Introscopy," by Somenkov et al., Zhurnal Tekhinicheskoi Fiziki, vol. 61, No. 11, Nov., 1991, pp. 1309–1311.

* cited by examiner

DARK-FIELD PHASE CONTRAST IMAGING

Applicant claims, under 35 U.S.C. § 119(e), the benefit of priority of: 1) the filing date of Dec. 28, 2000, of U.S. Provisional Patent Application Ser. No. 60/258,851, filed on the aforementioned date, the entire contents of which are incorporated herein by reference, and 2) the filing date of Feb. 28, 2001, of U.S. Provisional Patent Application Ser. No. 60/272,354, filed on the aforementioned date, the entire contents of which are incorporated herein by reference.

BACKGROUND OF THE INVENTION

1. Field of the Invention

The present invention relates to refractive imaging in general and x-ray refractive radiography in particular.

2. Discussion of Related Art

It is well known to use X rays for imaging the internal features of objects in those cases when the object is opaque in the visible optics domain, or when extremely high spatial resolution is necessary. Traditional x-ray imaging techniques are based on the absorption contrast, i.e., on the variation of the absorption factor of different parts of a sample. Therefore, the only way to increase a contrast of small objects in traditional x-ray images, is to increase the intensity of an x-ray beam. But this way is unacceptable in many cases. For example, strong x-ray beams cannot be used for visualization of the inner structure of integrated circuits because of their possible radiation damage, or for medical radiography for safety reasons. The refractive contrast, originating from the variation of the refractive indices of different parts of a sample, produces far more detailed images of the samples with small features. This type of x-ray imaging is commonly referred to as a phase contrast imaging (PCI). However, the direct beam, carrying practically no information about the object, if the latter is transparent to x rays, deteriorates the image, bringing additional noise into it. Therefore, the direct beam is undesirable.

Accordingly, it is an object of the present invention to significantly suppress the intensity of a direct beam during phase contrast imaging.

SUMMARY OF THE INVENTION

One aspect of the present invention regards an imaging system that includes a radiation generator that generates a beam of radiation along a first direction and an object that receives the beam of radiation, wherein a first portion of the beam of radiation is transmitted through the object along the first direction and a second portion of the beam of radiation is refracted along a second direction. An analyzer receives the first and second portions of the beam of radiation, the analyzer suppresses the intensity of the first portion of the beam of radiation and transmits the second portion of the beam of radiation. A detector system that receives from the analyzer the suppressed first portion of the beam of radiation and the transmitted second portion of the beam of radiation and generates an image of the object.

A second aspect of the present invention regards a method of imaging an object that includes subjecting an object to a beam of radiation that is directed along a first direction and analyzing a first portion of the beam of radiation that is transmitted through the object along the first direction so that the intensity of the first portion is suppressed. Analyzing a second portion of the beam of radiation that is refracted from the object. Generating an image of the object based on the suppressed first portion of the beam of radiation and the second portion of the beam of radiation.

An advantage of each aspect of the present invention is the reduction of the negative influence of the direct x-ray beam in an x-ray refractive imaging system.

A second advantage of each aspect of the present invention is the reduction in radiation flux that an object is subjected to during imaging.

Additional objects and advantages of the invention will become apparent from the following description and the appended claims when considered in conjunction with the accompanying drawings.

BRIEF DESCRIPTION OF THE DRAWINGS

FIG. 8b shows an enlarged portion of the reflection curve of FIG. 8a;

DETAILED DESCRIPTION OF THE PREFERRED EMBODIMENTS

Figure 1:
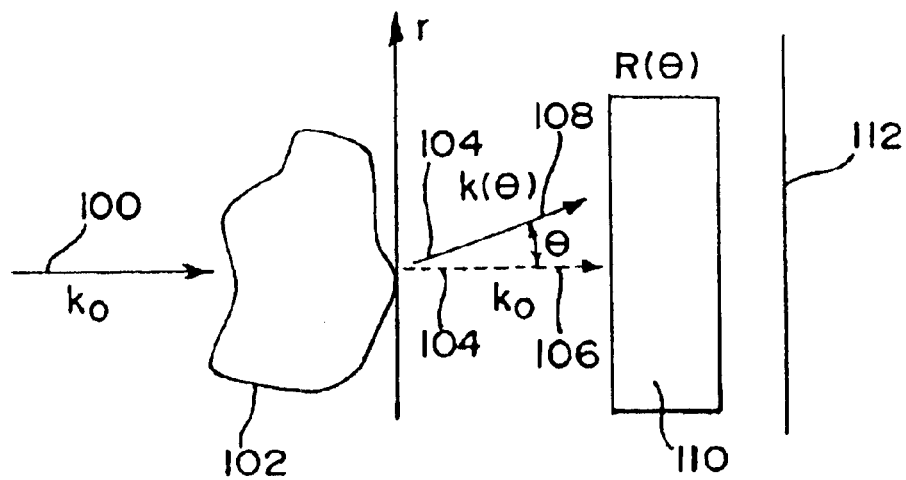
FIG. 1 schematically shows the fundamentals of x-ray refractive radiography in general.

The general principles of x-ray refractive radiography are shown in FIG. 1. In particular, a parallel x-ray beam 100 with a wave vector $k_0$ penetrates the object 102, transparent to x-rays. Because of the refraction of x-rays on the inner structure of the object 102, the output beam 104 is composed of the original wave 106 with the vector $k_0$ and the refracted waves 108 with vectors $k(\theta)$ slightly declined from the initial vector $k_0$. An analyzer 110 then differentiates the output waves 104 by their direction $\theta$. Thus, the resultant image registered in the image plane 112 directly behind the analyzer 110 is formed by the intensity variations $R(\theta)$ proportional to the angle of refraction $\theta$. Therefore, the resultant intensity distribution in the image plane 112 may be presented in the form of a sum $$I(r) = R[\theta(r)] + I_0 \qquad (1)$$

where $I_0$ is the intensity of the direct beam 106, which may be much greater than the useful term $R[\theta(r)]$. The direct beam 106 carries practically no information about the object, if the latter is transparent to x rays, and at the same time it deteriorates the image, bringing additional noise into it. Therefore, the detector shot noise produced by the direct beam decreases the signal-to-noise ratio, which is of a primary importance when an image is recorded electronically. For these reasons, the direct beam 106 is undesirable.

Figure 2:
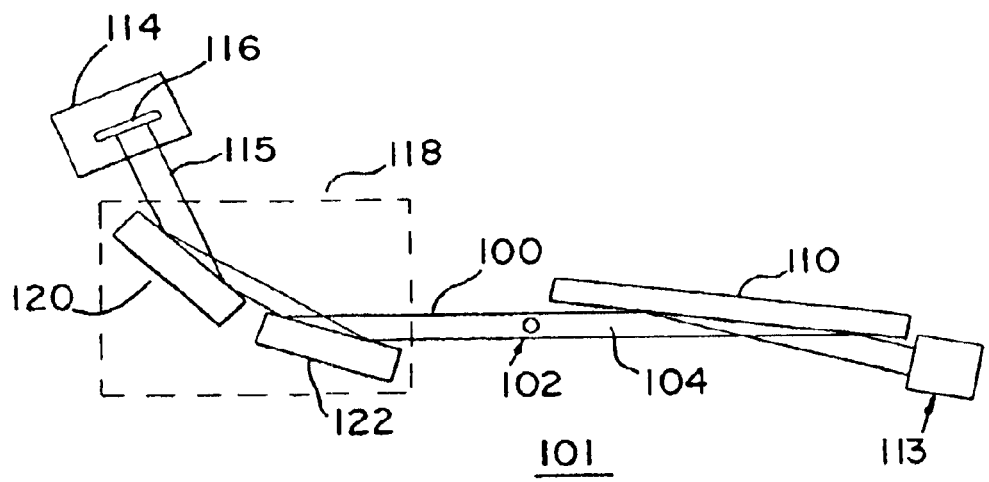
FIG. 2 schematically shows a top view of a first embodiment of an imaging system according to the present invention.
Figure 3:
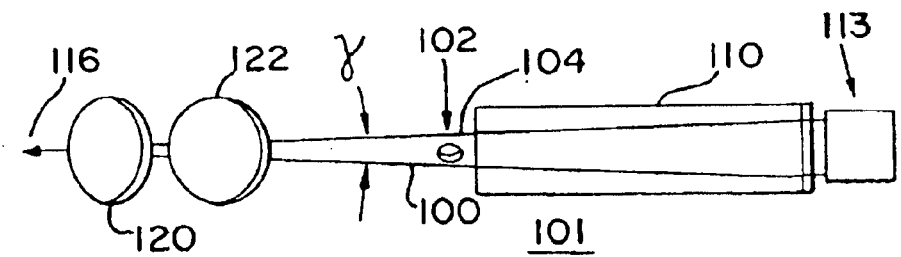
FIG. 3 schematically shows a side view of the imaging system of FIG. 2.

One embodiment of an imaging system that reduces the effects of the direct beam 106 is shown in FIGS. 2 and 3. In this embodiment, an x-ray tube 114 that works in the linear projection mode is used. As shown in FIG. 2, the x-ray tube 114 generates a beam 115 so that the long side of the focus 116 of the beam 115 is in the plane of incidence. The beam 115 is directed to a monochromator 118 that may be composed of two crystals 120, 122 that are well known in the art. The two crystals 120, 122 are selected so that they strongly disperse the beam 115 so as to generate highly parallel x-ray beams 100. The width of the beam 100 in the plane of incidence is limited by the length of either the x-ray tube focus 116 or the mirror 110, while the height of beam 100 is determined by the vertical divergence γ of the beam after the monochromator 110 according to the equation:

$$\gamma \approx \sqrt{\frac{8\Delta\alpha}{\tan\alpha}}. \tag{1}$$

Here α and Δα are the angle of incidence and the width of the Bragg reflection for the monochromator crystals 120, 122. The value of γ typically does not exceed 3°.

In the embodiment of FIGS. 2 and 3, the object 102 is preferably no larger than several millimeters so that the object 102 is fully covered by the x-ray beam 100. Accordingly, there is no need to move the object 102 during imaging. Please note that the divergence of the probe beam 100 should not exceed approximately 10 arc seconds. Apart from the divergence, the spectral width of the probe beam 100 also plays a significant role because the mirror 110's resonant angle depends on the wavelength. In the case of the x-ray tube 114 emitting X-ray beams about the $CuK_\alpha$ doublet, the natural relative spectral width of the $CuK_\alpha$ doublet including side wings is of the order of $4\times10^{-3}$. Such spectral widening increases the angular width of the resonance by a value of approximately 10 arc seconds. Therefore, the probe beam 100 preferably should not only have an extremely small divergence, but good spectral purity as well. Coupling the beam 115 with a double crystal monochromator 118 working in a strongly dispersive mode with both Si (111) reflections achieves such divergence and spectral purity. Using such a double crystal monochromator, the horizontal divergence of the probe beam 100 is approximately equal to 7.4 arc seconds, while the relative spectral width is approximately $5\times10^{-4}$, i.e., an order of magnitude less than the natural spectral width of the $CuK_\alpha$ radiation. Thus, the effect of spectral widening can be neglected.

Figure 9:
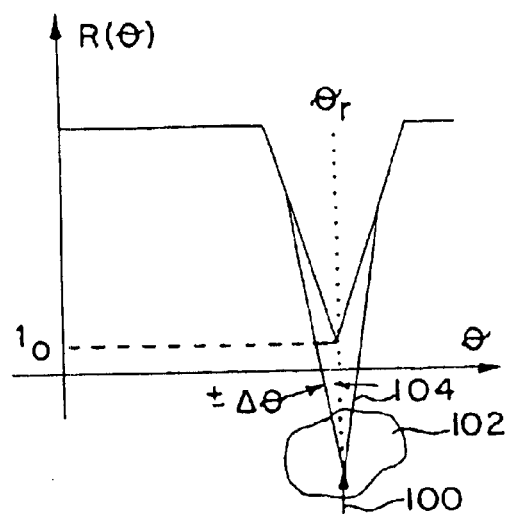
FIG. 9 schematically shows the intensity distribution of the analyzer of FIG. 7.

After the beam 100 interacts with the object 102, the beam 104 is directed to an analyzer 110 that suppresses the intensity of the original wave or beam 106 by several orders of magnitude in a manner as schematically shown in FIG. 9. The suppressed beam 106 and the refracted beam 108 are directed to the imaging plane 112 where a detector, such as an x-ray charge coupling device (CCD) 113, receives the beams. The detector then sends a signal to a processor (not shown) that generates an image that is formed on a display (not shown).

Figure 7:
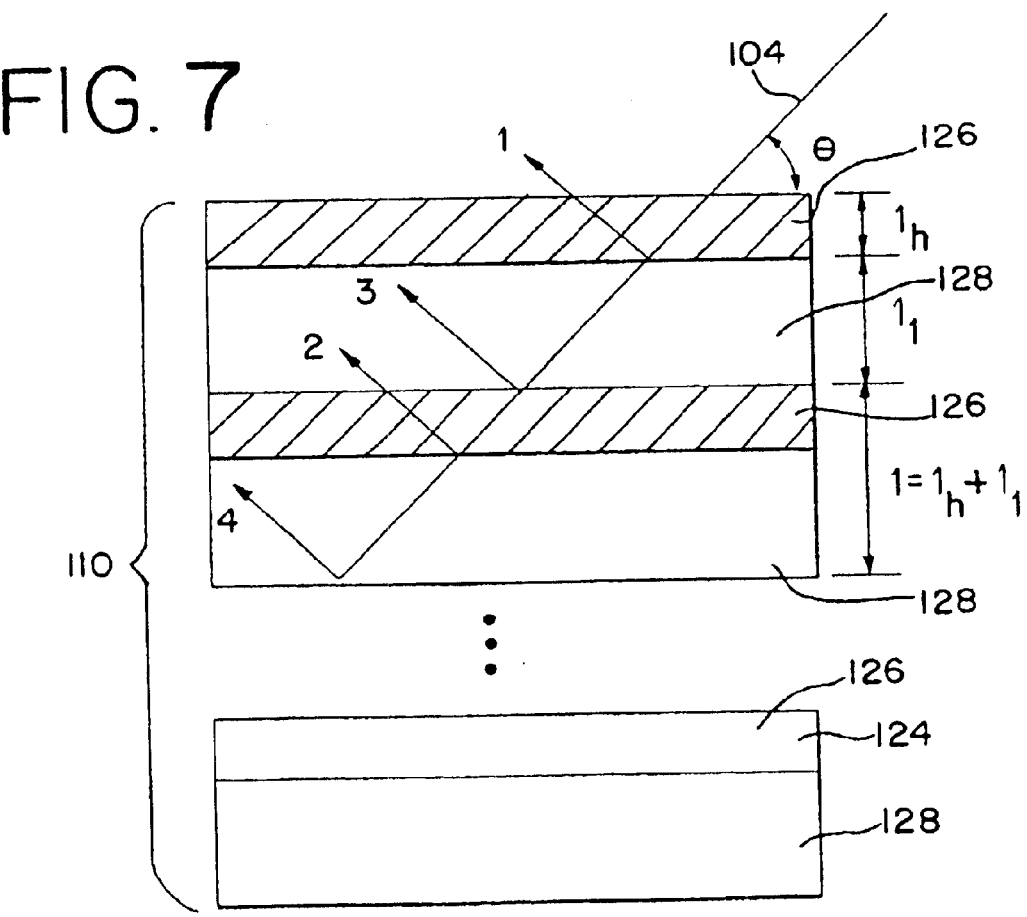
FIG. 7 schematically shows a side cross-sectional view of a first embodiment of an analyzer to be used with the imaging systems of FIGS. 2 and 4 according to the present invention.

One embodiment of an analyzer 110 that can suppress the intensity of the beam 106 is shown in FIG. 7. In particular, the analyzer 110 of FIG. 7 is a specially designed multilayer mirror 124. The reflective coating of the x-ray multilayer mirror 124 is composed of many altering layers of materials with large and small atomic numbers. For instance, the layers 126 with large atomic numbers may be made of tungsten while the layers 128 with small atomic numbers may be made of boron-carbide, i.e., $B_4C$. The thickness of the layers may differ, but they are typically of the order of 10 Å–50 Å. The interfacial roughness is equal to 5 Å.

Figure 8A:
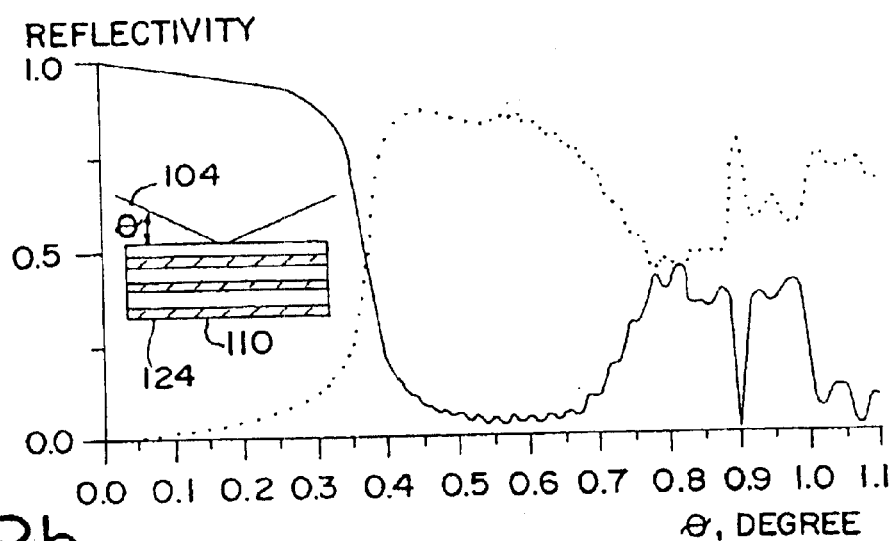
FIG. 8a shows angular reflection and absorption curves for the analyzer of FIG. 7.
Figure 8B:
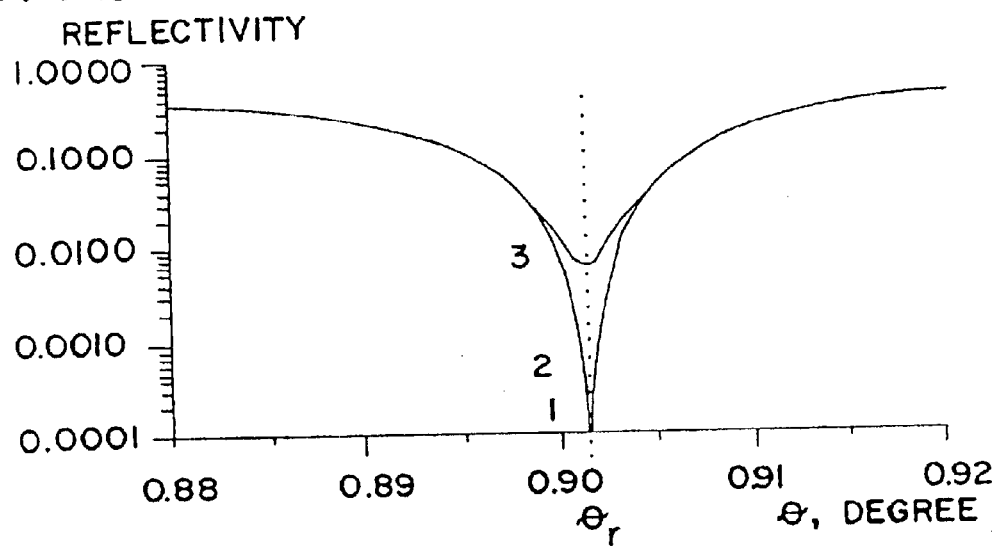

As described in "X-Ray Multilayer Mirrors with an Extended Angular Range," by Protopopov et al., Optics Communications Vol. 158 (1998), pp. 127–140, the entire contents of which are incorporated herein by reference, it is possible to control the shape of the angular and spectral reflection curves by altering the thickness of the layers 126 and 128. Depth-graded multilayer mirror can be analyzed as a combination of traditional multilayer structures with constant periods, imposed one on another and calculated for different grazing angles. The range of periods is chosen so as to cover a given angular region. At a definite grazing angle only one structure reflects, namely that whose period matches the grazing angle. Others, on top are transparent to x-rays, although introducing some attenuation. Varying slightly the thickness of layers it is possible to make the partial reflected waves approximately counterphased at a specific grazing angle θ, so as to obtain as small reflection at this angle as possible. Moreover, the total reflection can be made even less if not only the phases of the partial waves are opposite each to another, but the coming and reflected waves produce interference pattern whose maxima at this particular angle coincide with the layers of heavy material, introducing additional absorption. Thus, it is possible to design a mirror with deep (the reflectivity of the order of $10^{-2}$–$10^{-3}$) and narrow (several arc seconds) resonant gap in the angular reflection curve as shown in FIGS. 8a–b. The roles of reflection and absorption are clear from the solid and dashed curves, respectively, in FIG. 8a. In addition, the sensitivity of the scheme with respect to the refracted beams 108 is determined by the sharpness of the reflection curve around the resonant angle $\theta_r$.

It should be kept in mind that the angular divergence ω of the beam 100 is a very important parameter determining both the depth and the angular width of the resonant gap. That is clear from FIG. 8b, where three reflection curves labeled 1, 2, 3, calculated for different values of ω (curve 1: $2_\omega=0$; curve 2: $2_\omega=0.003°$ (10 arc sec.); curve 3: $-2_\omega=0.016°$ (1 arc min.)), are shown.

Figure 10:
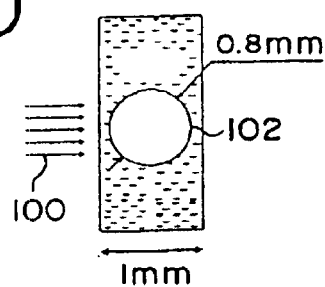
FIG. 10 schematically shows a test object that can be imaged by the imaging systems of FIGS. 2 and 4.
Figure 12A:
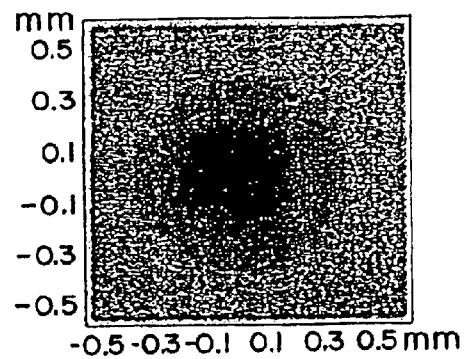
FIGS. 12a–c show pictures of the test object of FIG. 10 when imaged by the imaging systems of FIGS. 2 and 4 and with the analyzer of FIG. 7.
Figure 12B:
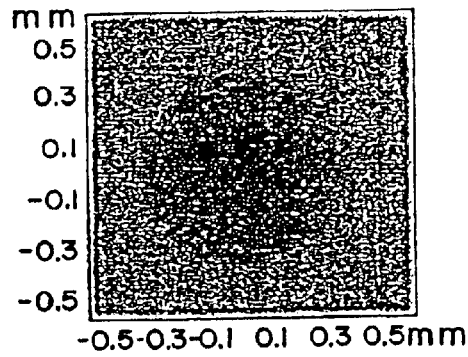
Figure 12C:
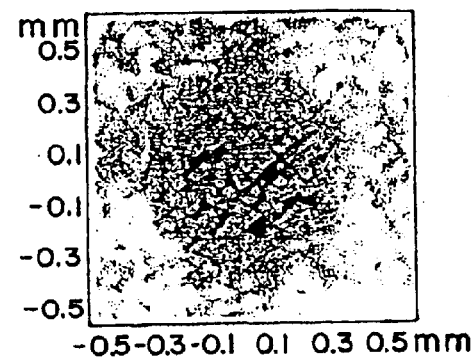

As shown in FIGS. 12a–c, the sharpness of the gap in the reflection curve of the multilayer mirror 124 is sufficient to effectively detect small-contrast images. In particular, when a test object 102 is in the form of a carbon sphere of 0.8 mm in diameter, surrounded by a layer of water 1 mm thick as shown in FIG. 10 and is used as the object of the imaging system 101 of FIG. 2, then improved images are obtained. The three images of FIGS. 12a–c are obtained in a geometrical optics approximation, for $CuK_\alpha$ radiation (1.54 Å), using the reflection curve 2 in FIG. 8b. The divergence of the primary beam 100 is chosen to be $2_\omega=0.003°$ (10 arc sec.), that is a practically attainable value, while the distance between the object 102 and the image plane is 100 mm. Under these conditions the loss of resolution due to the beam divergence is negligible. The images of FIGS. 12a–c differ from each another by the total number of photons/flux in the primary beam 100 where FIGS. 12a–c have fluxes of $10^6$ photons/mm$^2$, $10^5$ photons/mm$^2$ and $10^4$ photons/mm$^2$, respectively. In addition, the horizontal axes of the images lie in the incidence plane of the multilayer mirror 124.

Therefore, the contours of the sphere are disconnected at the top and at the bottom, where the projections of the refracted beam vectors onto the incidence plane have no deflections.

Figure 11A:
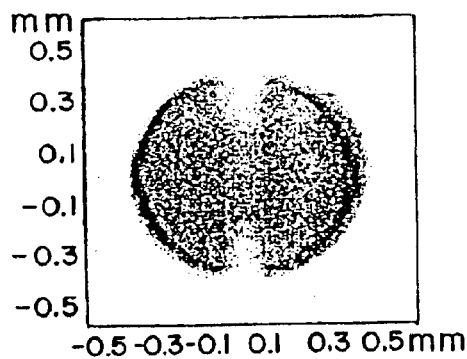
FIGS. 11a–c show pictures of the test object of FIG. 10 when imaged by the imaging systems of FIGS. 2 and 4 but without the analyzer of FIG. 7.
Figure 11B:
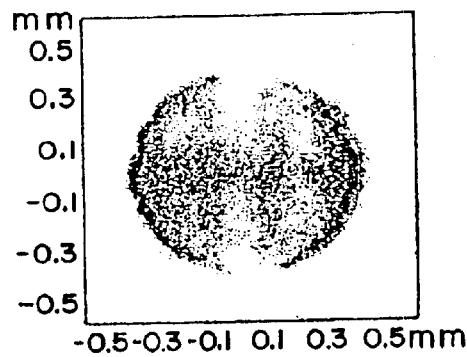
Figure 11C:
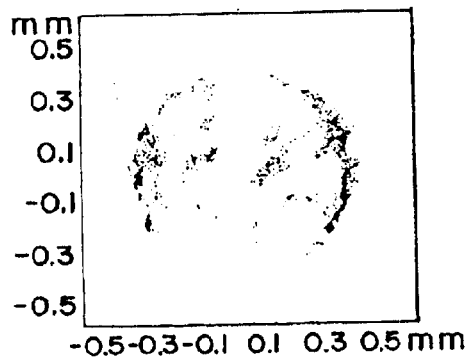

As shown in FIGS. 11a–c, the test object of FIG. 10 was subjected to x-rays under the same conditions as FIGS. 12a–c, respectively, so as to form absorption-contrast images simulated for a traditional x-ray radiography scheme, i.e., without the analyzer. Comparing the images shows that contour of the carbon sphere pattern is recognized in each of the images of FIGS. 11a and 12a obtained with a photon flux of $10^6$ photons/mm$^2$. However, at lower fluxes the contours and the pattern itself can hardly be recognized in absorption-contrast images (FIGS. 11b, 11c). As far as the refraction-contrast images of FIGS. 12b and 12c are concerned, the sphere pattern can be recognized even at a flux of $10^4$ photons/mm$^2$. Thus, the radiation dose can be decreased by approximately two orders of magnitude in comparison with traditional x-ray radiography. This is advantageous when imaging biological objects.

Figure 4:
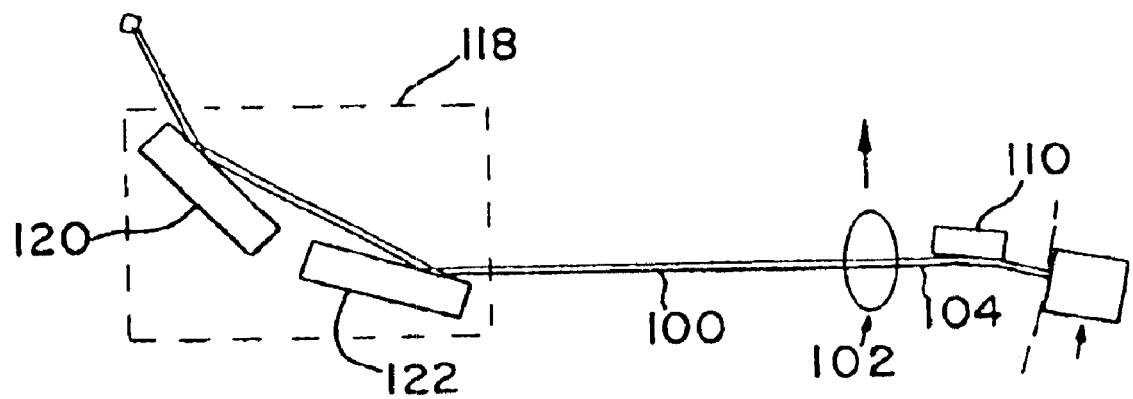
FIG. 4 schematically shows a top view of a second embodiment of an imaging system according to the present invention.
Figure 5:
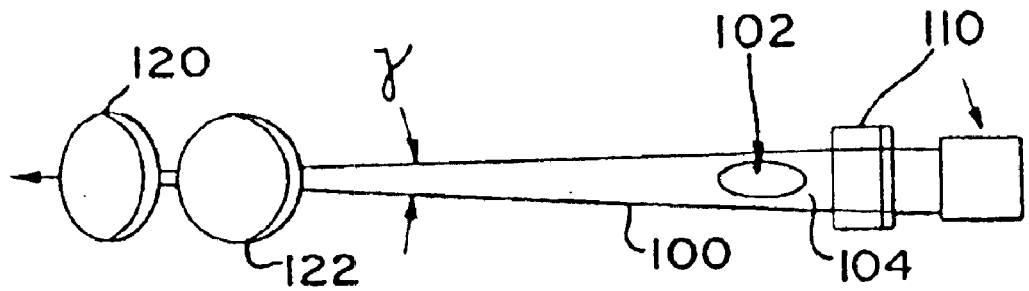
FIG. 5 schematically shows a side view of the imaging system of FIG. 4.
Figure 6:
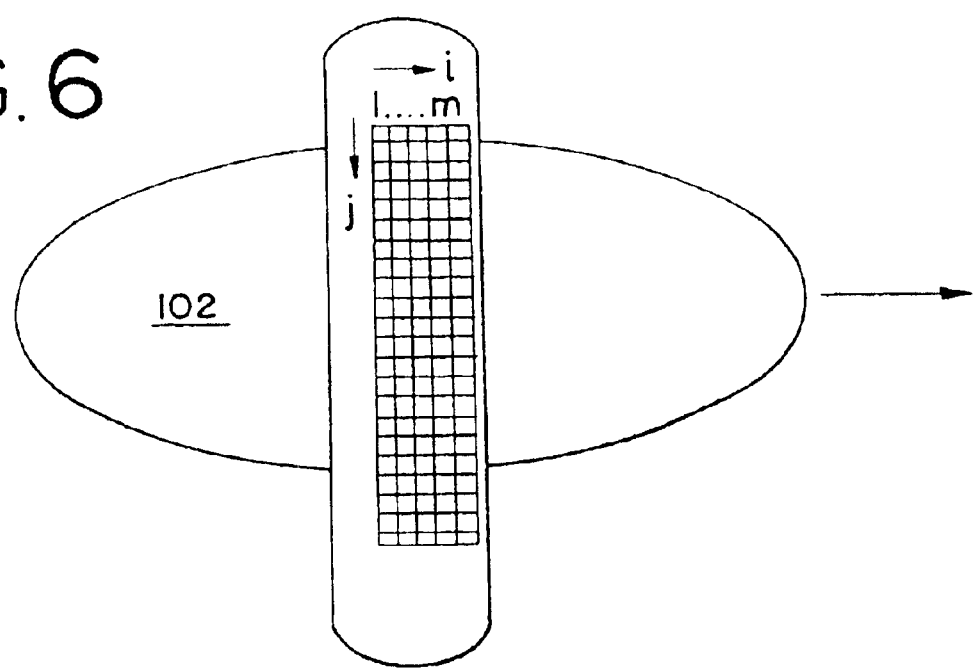
FIG. 6 schematically shows a mode of scanning to be used with the imaging system of FIG. 4.

If it is desired to image objects that are larger than 2 mm and have dimensions up to 150–200 mm, then a modified imaging system can be employed. This is advantageous for biological and medical applications. An embodiment of such an imaging system is shown in FIGS. 4–6. In this embodiment, the x-ray tube 114 works in the point projection mode. The width of the beam in the plane of incidence is limited by the x-ray tube focus, and is an order of magnitude less than that for the imaging system of FIGS. 2–3. Consequently, the length of the mirror 110 in this direction may be much less than in the previous case.

As shown in FIG. 4, the x-ray tube 114 generates a beam 115 that is directed to the monochromator 118 that is composed of two crystals 120, 122 that are similar to those described previously with respect to the imaging system of FIG. 2. Again, the two crystals 120, 122 are selected so that they strongly disperse the beam 115 so as to generate highly parallel x-ray beams 100.

In the embodiment of FIGS. 4 and 5, the object 102 is preferably larger than the width of the x-ray beam 100. Accordingly, there is a need to move the object 102 relative to the detector 113 during imaging as shown in FIG. 6. The object 102 may be moved by a number of conventional devices, such as stepping motor driven translation stages that are well known in optical imaging.

After the beam 100 interacts with the object 102, the beam 104 is directed to an analyzer 110 that suppresses the intensity of the original wave or beam 106 by several orders of magnitude in a manner as schematically shown in FIG. 9. The suppressed beam 106 and the refracted beam 108 are directed to the imaging plane 112 where a detector, such as an x-ray charge coupling device 113, receives the beams. The detector then sends a signal to a processor (not shown) that generates an image that is formed on a display (not shown). The analyzer 110 preferably has a structure that is similar to that as the analyzer 110 used in the imaging system of FIGS. 2–3.

As shown in FIG. 6, the object 102 is scanned in the plane of incidence in the direction transversal to the x-ray beam 100, so that each moment of time only a small fraction of the object is investigated. During each moment of time t the detector signal can be described by the matrix $U_{ij}(t)$, where i and j are the ordinal numbers of its sensitive elements. The signals corresponding to the same row j but different column i differ each from another only by the time delay equal to $i\tau$, where $\tau$ is the time interval during which the object is shifted by a distance equal to a single detector element. Therefore, it is possible to average the signals from different columns if only take into account the delay. Such an averaging will rise the sensitivity and signal-to-noise ratio because the noise in the channels is uncorrelated. The time t corresponds to the first discrete coordinate of the image k by the formula $t=k\tau$, while the second discrete coordinate of the image is the row number j. Thus, the averaged discrete image can be written in the following form:

$$v_{kj} = \frac{1}{m}\sum_{i=1}^{m} u_{ij}(t - i\tau) = \frac{1}{m}\sum_{i=1}^{m} u_{ij}[\tau(k - i)],$$

where m is the number of columns in the detector.

The images obtained using the imaging system of FIGS. 4–6 are comparable to those images obtained using the imaging system of FIGS. 2–3 and thus the imaging system of FIGS. 4–6 enjoys many of the advantages of the imaging system of FIGS. 2–3 as described previously.

While the above description constitutes the preferred embodiments of the present invention, it will be appreciated that the invention is susceptible of modification, variation and change without departing from the proper scope and fair meaning of the accompanying claims.

I claim:

1. An imaging system comprising:

a radiation generator that generates a beam of penetrating radiation along a first direction;

an object that receives said beam of penetrating radiation, wherein a first portion of said beam of penetrating radiation is transmitted through said object along said first direction and a second portion of said beam of penetrating radiation is refracted along a second direction;

an analyzer that receives said first and second portions of said beam of penetrating radiation, said analyzer suppresses the intensity of said first portion of said beam of penetrating radiation and transmits said second portion of said beam of penetrating radiation; and a detector system that receives from said analyzer said suppressed first portion of said beam of penetrating radiation and said transmitted second portion of said beam of penetrating radiation and generates an image of said object.

2. The imaging system of claim 1, wherein said beam of penetrating radiation is a parallel beam of penetrating radiation.

3. The imaging system of claim 1, wherein said radiation generator comprises an x-ray source that generates a beam of x-rays.

4. The imaging system of claim 2, wherein said radiation generator comprises an x-ray source that generates a beam of x-rays.

5. The imaging system of claim 3, wherein said radiation generator comprises a monochromator that receives said beam of x-rays from said x-ray source and generates a parallel beam of x-rays.

6. The imaging system of claim 4, wherein said x-ray source works in a linear projection mode.

7. The imaging system of claim 1, wherein said object is smaller than said beam of penetrating radiation.

8. The imaging system of claim 1, wherein said analyzer comprises a multi layer mirror.

9. The imaging system of claim 3, wherein said analyzer comprises a multilayer mirror.

10. The imaging system of claim 8, wherein said multilayer mirror comprises alternating layers of materials with large and small atomic numbers, wherein the thicknesses of the alternating layers is varied so as to suppress the intensity of said first portion of said beam of penetrating radiation.

11. The imaging system of claim 10, wherein said material with a large atomic number is tungsten and said material with a small atomic number is boron-carbon.

12. The imaging system of claim 9, wherein said multilayer mirror comprises alternating layers of materials with large and small atomic numbers, wherein the thicknesses of the alternating layers is varied so as to suppress the intensity of said first portion of said x-ray beam.

13. The imaging system of claim 12, wherein said material with a large atomic number is tungsten and said material with a small atomic number is boron-carbon.

14. The imaging system of claim 4, wherein said x-ray source operates in a point projection mode.

15. The imaging system of claim 14, wherein said object moves relative to said detector system.

16. The imaging system of claim 15, wherein said detector system comprises a detector comprising a column of sensitive elements.

17. The imaging system of claim 16, wherein signals from said column of sensitive elements are averaged to obtain an image signal.

18. The imaging system of claim 17, wherein said image signal is represented by the formula:

$$v_{kj} = \frac{1}{m}\sum_{i=1}^{m} u_{ij}[\tau(k-i)],$$

where $u_{ij}(t)$ is the signal generated by the sensitive element located at the ith row and jth column of the detector array, $\tau$ is the time interval during which the object is shifted by a distance equal to a single detector element, m is the number of columns of sensitive elements in the detector, k is the image obtained at time $t=k\tau$.

19. A method of imaging an object, comprising:

subjecting an object to a beam of penetrating radiation that is directed along a first direction;

analyzing a first portion of said beam of penetrating radiation that is transmitted through said object so that the intensity of said first portion is suppressed;

analyzing a second portion of said beam of penetrating radiation that is refracted from said object;

generating an image of said object based on said suppressed first portion of said beam of penetrating radiation and said second portion of said beam of penetrating radiation.

20. The method of claim 19, wherein said beam of penetrating radiation is a parallel beam of penetrating radiation.

21. The method of claim 19, wherein said beam of penetrating radiation comprises x-rays.

22. The method of claim 20, wherein said beam of penetrating radiation comprises x-rays.

23. The method of claim 19, wherein said object does not move during said generating an image.

24. The method of claim 19, wherein said object moves during said generating an image.

25. The method of claim 19, wherein said generating an image comprises averaging signals from a column of sensitive elements of a detector.

* * * * *